[11] 3,581,200

[72] Inventor Ralph W. Mifflin
R. D. 4, Rome, N.Y. 13440
[21] Appl. No. 800,239
[22] Filed Feb. 18, 1969
[45] Patented May 25, 1971
Continuation-in-part of application Ser. No. 531,649, Feb. 25, 1966.

[54] APPARATUS FOR DERIVING THE PROBABILITY DENSITY FUNCTION OF A SIGNAL WITH RESPECT TO AMPLITUDE
2 Claims, 4 Drawing Figs.
[52] U.S. Cl..................................................... 324/77R,
324/88, 324/103
[51] Int. Cl..................................................... G01r 23/16
[50] Field of Search............................................ 324/77,
103, 120, 99 D, 88

[56] References Cited
UNITED STATES PATENTS
| | | | |
|---|---|---|---|
| 2,971,152 | 2/1961 | Ranky............................ | 324/77X |
| 3,064,193 | 11/1962 | Grubb et al.................... | 324/120 |
| 3,188,455 | 6/1965 | Quick............................ | 235/183 |

*Primary Examiner*—Edward E. Kubasiewicz
*Attorneys*—Harry A. Herbert, Jr. and James S. Shannon ABSTRACT: The probability density function of a signal the amplitude of which is the variate is derived by first producing a constant amplitude FM wave the instantaneous frequency of which is linearly related to the instantaneous amplitude of the signal. A spectrum analyzer and integrator are then used to derive the energy-frequency distribution of the FM wave. This distribution is the probability density function of the signal and is displayed on a suitable X-Y display device synchronized with the spectrum analyzer sweep.

PATENTED MAY 25 1971 3,581,200

INVENTOR.
RALPH W. MIFFLIN
BY *Harry A. Herbert Jr.*
ATTORNEY

*James L. Shannon*
AGENT

APPARATUS FOR DERIVING THE PROBABILITY DENSITY FUNCTION OF A SIGNAL WITH RESPECT TO AMPLITUDE

CROSS-REFERENCES TO OTHER APPLICATIONS

This application is a continuation-in-part of my application Ser. No. 531,649, filed Feb. 25, 1966.

BACKGROUND OF THE INVENTION

This invention relates to signal analyzers and particularly to the analysis of signals having a continuously varying amplitude with respect to which there is a probability distribution. One field in which such signals occur is that of radio communication.

The probability distribution with which this invention is concerned is the probability density function. This function gives the probability that a continuous variate will assume a value near any particular value in its range of values. Another probability distribution of a continuous variate is the cumulative distribution function. This function gives the probability that the variate will assume a value equal to or less than a particular value in its range of values. Either of these functions may be derived from the other mathematically. Thus the probability density function is the first derivative of the cumulative distribution function with respect to the variate, and the cumulative distribution function may be obtained by successive integration of the probability density function over variate value ranges between the lowest value and successively higher values within the range of variate values. Either of these functions may be plotted from data obtained directly from the signal.

The probability density function with respect to signal amplitude as the variate is of particular importance in signal analysis since it gives the probability, or the fraction of total time, that the amplitude will fall within a specified range. This probability is the fraction obtained by dividing the area under that part of the function curve between the minimum and maximum amplitudes defining the amplitude range of interest by the total area under the curve. This probability varies from zero where the range of interest is of zero width, i.e. a particular amplitude, to unity where the range of interest is the total range of amplitude variation of the signal.

Prior devices for deriving the probability density function of the amplitude of a signal have employed a series of amplitude gates defining adjacent small amplitude ranges covering the range of amplitude variation of the signal. These gates open and close as the signal traverses the various levels. The time during which each gate is open is measured and these times expressed as fractions of total time of the observation give the probabilities that the signal will fall within any of the amplitude ranges. Plotting these values along the Y-axis versus the amplitude ranges along the X-axis provides a curve representing the probability density function of the signal. Limitations and disadvantages of these devices are the amount and complexity of the equipment required, the restriction of bandwidth and consequent inability to handle rapidly changing signals due to the time required to actuate the gates, the amount of quantization noise generated, and the amount of processing required to convert the data to usable form.

SUMMARY OF THE INVENTION

The purpose of the invention is to provide an apparatus for directly obtaining the probability density function with respect to the amplitude or voltage of an electrical signal. This is accomplished by first transferring the amplitude statistics of the signal to the frequency domain. This transfer is effected by a wide band constant amplitude frequency modulated wave generator which produces a constant amplitude FM wave the instantaneous frequency of which is linearly related to the instantaneous amplitude or voltage of the signal. A spectrum analyzer is then used to derive the energy-frequency distribution of the FM wave. Since the FM wave has a constant amplitude, the energy in the wave at any particular frequency, or, more accurately, in a very narrow band of frequencies centered on the particular frequency, is proportional to the length of time the frequency of the wave is near the particular frequency, i.e. within the narrow band. If the sampling periods for all frequencies are of the same length, the energy near any particular frequency is also proportional to the fraction of the sampling period during which the frequency of the FM wave is near the particular frequency or, in other words, to the probability that the frequency of the FM wave will have a value near the particular frequency. Therefore, the energy-frequency distribution of the FM wave represents the probability density function for this wave with respect to frequency as the variate. Since, as stated above, the frequency of the FM wave is linearly related to the amplitude of the signal under test, the above energy-frequency distribution also represents the probability density function of the signal with amplitude as the variate, which is the result sought.

In the described apparatus, the spectrum analyzer is caused to sweep over the total frequency range very slowly, for example, in one minute or more, in order that the analyzer will remain near each frequency long enough for the signal samples at each frequency to be statistically as nearly alike as practicable. Also, the integration in the output circuit of the spectrum analyzer must be sufficient to average the output over the sample period. If the amount of integration provided for in the instrument is insufficient for this purpose, the output may be averaged by an external integrator. The probability density function may be displayed on an X-Y plotter, or on an oscilloscope with a long persistent phosphor or other arrangement for storing the image. The display device has its X-axis sweep synchronized with the frequency sweep of the spectrum analyzer and receives the integrated output of the spectrum analyzer as its Y-axis input.

DESCRIPTION OF THE PREFERRED EMBODIMENT

Figure 1:
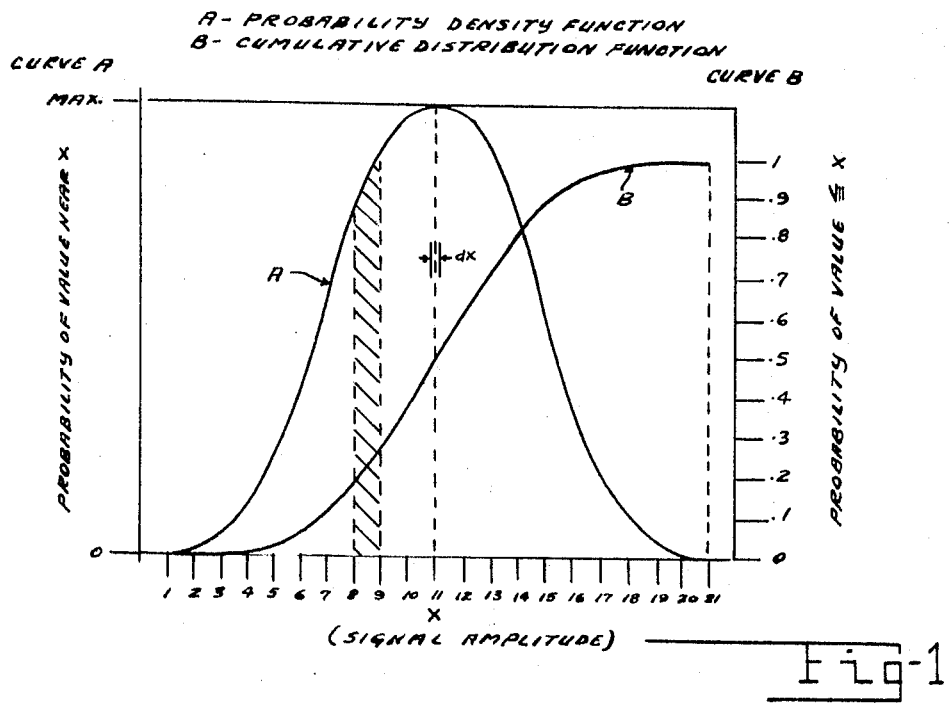
FIG. 1 shows the probability density function and the cumulative distribution function for a signal the amplitude of which has a Gaussian distribution.

Curve A of FIG. 1 illustrates the probability density function with respect to amplitude for a signal whose amplitude $x$ can have any value in a range $x=1$ to $x=21$ in accordance with a Gaussian distribution. Certain noise signals have amplitude distributions of this type. The ordinate of this curve for any value of $x$ is proportional to the probability that the signal amplitude will assume a value near this value of $x$. This may be seen from the following considerations: As stated earlier, the probability that the amplitude will fall within any specified range of values is equal to the area under that part of the curve in this range divided by the total area under the curve. For example, the probability that the amplitude will fall within the range $x=8$ to $x=9$ is equal to the hatched area divided by the total area under the curve. Similarly, if for any value of $x$ there is taken an infinitesimally small amplitude range $dx$ centered on the value of $x$, as seen in FIG. 1 for $x=11$, then the probability $P$ that the amplitude will fall within the range $dx$ is given by the expression $$P = \frac{hdx}{A}$$

where $h$ is the ordinate of the curve at the particular value of $x$ and $A$ is the total area under the curve. Since $dx$ and $A$ are constants for all values of $x$, the probability that the amplitude will fall within the range $dx$, i.e. have a value near $x$, is proportional to the ordinate $h$ at the value $x$. As seen from the above equation, the actual probability or fraction of the total time that the amplitude falls within the range $dx$ approaches zero as $dx$ approaches zero. Therefore, the probability of the amplitude assuming any particular value of $x$ is zero. On the other hand, as the amplitude range is increased the probability increases, becoming unity for the range $x=1$ to $x=21$.

FIG. 1 also shows in curve B the cumulative distribution function of the same signal. This curve gives the probability that the amplitude of the signal will assume a value equal to or less than any particular amplitude. The probability, for example, is zero for the amplitude $x=1$, 0.5 for the amplitude $x=11$, and unity for the amplitude $x=21$, which agree with the probabilities as computed from curve $A$. As stated earlier, the function represented by curve $A$ is the first derivative of the function represented by curve B and curve B can be derived from curve $A$ by successive integration between $x=1$ and successively higher values of $x$ up to $x=21$.

Figure 2:
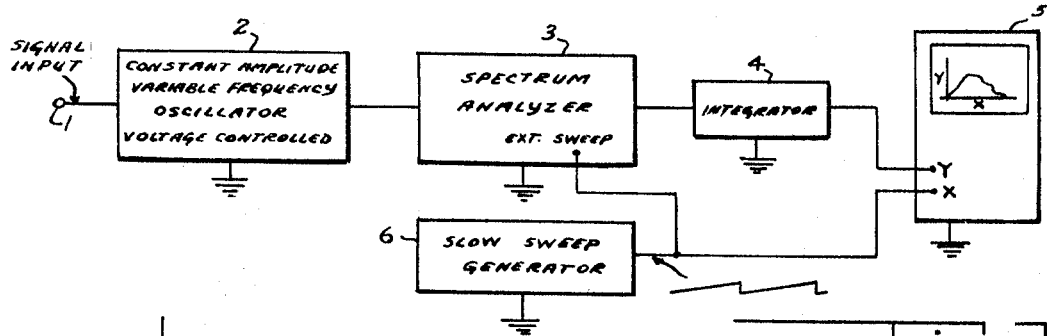
FIG. 2 in a block diagram of apparatus for deriving the probability distribution function of a signal in accordance with the invention.
Figure 3:
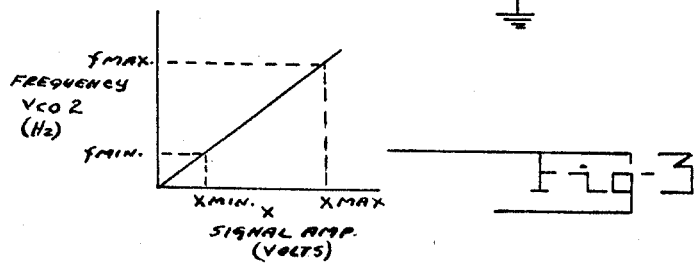
FIG. 3 shows the relationship between volts input to the constant amplitude variable frequency oscillator of FIG. 2 and the frequency of its output wave.

The apparatus for deriving the probability density function directly from the signal is shown in FIG. 2. The signal to be analyzed is applied via input terminal 1 to a voltage controlled constant amplitude variable frequency oscillator 2. The oscillator 2 may be of any suitable type capable of accommodating the voltage range of the signal under test with a modulation index of at least 10 but preferably of 100 or more, the modulation index being the ratio of the variation of the carrier frequency away from its average value to the maximum frequency of the modulating signal, in this case the signal being analyzed. The relationship between the signal amplitude and the frequency of the output wave of oscillator 2 should be linear as illustrated in FIG. 3. Because of this linear relationship, the probability distribution of the frequency of the constant amplitude output wave of oscillator 2 is the same as the probability distribution of the amplitude of the signal. Therefore if the probability density function with respect to frequency is derived for the output wave of oscillator 2 it will have the same form as the probability density function with respect to amplitude of the signal being analyzed.

The probability density function with respect to frequency of the output wave of oscillator 2 has the same form as the energy frequency distribution of this wave. The reason for this is that, in a given sampling period, the energy at frequencies near any particular frequency in the range of frequencies of a constant amplitude frequency modulated wave is proportional to the fraction of the sampling period during which the frequency of the wave is near the particular frequency, and therefore is proportional to the probability that the frequency will assume a value near the particular frequency. Consequently, if, for a sampling period that is the same for all frequencies, the energy in the wave at frequencies near each frequency in the range of frequencies is plotted as an ordinate against the particular frequency as an abscissa, there results a curve each ordinate of which is proportional to the probability that the frequency of the wave will assume a value near the frequency represented by the corresponding abscissa. This by definition is the probability density function of the wave with respect to frequency.

The energy-frequency distribution of the frequency modulated wave produced by oscillator 2 is derived by spectrum analyzer 3 and integrator 4, and is displayed by the X-Y display device 5. As discussed later, the external integrator 4 and the external sweep generator 6 may not be required if the built-in integration and sweep capabilities of the spectrum analyzer are adequate for the purposes of the invention. The term "spectrum analyzer" is generally understood in the art to mean a device for determining the energy-frequency distribution of a signal and is so used here. Any spectrum analyzer may be used that can accommodate the frequency range of the frequency modulated wave. A spectrum analyzer is essentially a narrow band superheterodyne receiver in which the bandwidth of the input or radio frequency section is as wide or wider than the frequency spectrum to be investigated. It has a local oscillator, a mixer, an intermediate frequency amplifier, a detector and a video or output amplifier. The receiver is swept in frequency at a constant rate over the frequency band to be investigated by varying the frequency of the local oscillator. Whenever the frequency to which the receiver is adjusted is present in the input signal an output occurs from the spectrum analyzer. The magnitude of the output is dependent upon a number of factors among which are the input signal amplitude, the sweep rate, the duration of the input signal, and the amount of integration incorporated in the detector and output circuits. In the present case the input to the spectrum analyzer is at a constant amplitude so that signal amplitude is not a factor in the relative output magnitudes. Sweep rate and the integrating ability of the analyzer, however, are of prime importance.

The sweep rate of analyzer 3 must be low enough that the period during which the analyzer remains near any particular frequency is of sufficient length that the signal samples present during these periods are substantially alike statistically. In a typical example, the sweep rate may be such that one minute or more is required to scan over the entire frequency range. Also, in order for the magnitude of the analyzer output signal to be proportional to the energy in the wave near any particular frequency, the analyzer must be able to integrate the detector output over the effective sampling period for each frequency as defined above. In a typical case, this requires an integrator time constant of 1 to 2 seconds.

Figure 4:
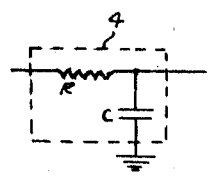
FIG. 4 illustrates a suitable form of the integrator of FIG. 2.

Commercial spectrum analyzers may not have provision for sweep rates as low or integrating periods as long as required. In this case it is necessary to use an external sweep voltage generator 6 and an external integrator 4. Generator 6 may be any known type of linear ramp generator capable of producing a voltage ramp of one minute or more duration. Integrator 4 may be a simple R-C circuit as shown in FIG. 4. The capacitor C may have, for example, a capacity of 20 mfd. In determining the value of R the resistance of the analyzer output circuit should be taken into account. For a 1—2 second time constant, the total series resistance would be 50,000—100,000 ohms.

The above discussion concerning sweep rates and integration time constants assumes that the signal being analyzed is aperiodic. For periodic signals the sampling period need be only as long as a period of the wave or a multiple of the period. This situation may result in higher sweep rates and shorter integrating time constants but the principles remain the same.

The X-Y display device 5 may be of any suitable type such as an X-Y plotter or oscilloscope with long persistent phosphor or other means for storing the image. The signal representing energy is applied to the Y input and the sweep voltage to the X input. The curve that is plotted represents the probability density function with respect to amplitude for the signal applied to terminal 1, for reasons already given. The shape of the curve depends upon the amplitude statistics of the signal, the curves in FIG. 1 for a Gaussian distribution being selected merely as an example.

I claim:

1. Apparatus for deriving the probability density function of a signal the amplitude of which is the variate, said apparatus comprising: means to which said signal is applied for producing a constant amplitude wave the instantaneous frequency of which is linearly related to the instantaneous amplitude of said signal; and means to which said wave is applied for driving the energy-frequency distribution of the wave, said distribution being the desired probability density function. an 2. Apparatus as claimed in claim 1 in which the means for deriving the energy-frequency distribution of said wave comprises a spectrum analyzer to which said wave is applied said spectrum analyzer having provision for sweeping over the frequency range of said wave at a constant rate sufficiently low that the analyzer remains near each frequency for a long enough sampling period that the samples of the signal analyzed at each frequency are alike statistically, said spectrum analyzer also having provision for integrating its output over said sampling period; an X-Y rectangular coordinate display means having an X input and a Y input; means for applying the integrated output of said spectrum analyzer to the Y input; and means for applying a signal to the X input that is linearly related to the frequency sweep of said spectrum analyzer.